(12) United States Patent
Niizuma

(10) Patent No.: US 9,592,740 B2
(45) Date of Patent: Mar. 14, 2017

(54) PARKING FACILITY

(75) Inventor: Motonao Niizuma, Tokyo (JP)

(73) Assignee: IHI CORPORATION (JP)

( * ) Notice: Subject to any disclaimer, the term of this patent is extended or adjusted under 35 U.S.C. 154(b) by 554 days.

(21) Appl. No.: 14/007,773

(22) PCT Filed: Mar. 15, 2012

(86) PCT No.: PCT/JP2012/056774
§ 371 (c)(1),
(2), (4) Date: Sep. 26, 2013

(87) PCT Pub. No.: WO2012/132946
PCT Pub. Date: Oct. 4, 2012

(65) Prior Publication Data
US 2014/0015312 A1 Jan. 16, 2014

(30) Foreign Application Priority Data

Mar. 30, 2011 (JP) .................. 2011-073949

(51) Int. Cl.
*H02J 50/10* (2016.01)
*B60L 11/18* (2006.01)
*E04H 6/22* (2006.01)
*E04H 6/42* (2006.01)

(52) U.S. Cl.
CPC ............ B60L 11/182 (2013.01); *E04H 6/22* (2013.01); *E04H 6/42* (2013.01)

(58) Field of Classification Search
CPC . E04H 6/22; E04H 6/42; B60L 11/182; B60L 11/1824
USPC ........................................................ 307/104
See application file for complete search history.

(56) References Cited

U.S. PATENT DOCUMENTS

2010/0277121 A1* 11/2010 Hall ...................... B60L 11/182
320/108
2011/0140658 A1* 6/2011 Outwater ............ B60L 11/1824
320/109

FOREIGN PATENT DOCUMENTS

| CN | 201674240 U | 12/2010 |
|---|---|---|
| JP | 05-256038 | 10/1993 |
| JP | 09-215211 | 8/1997 |
| JP | 2002-004620 | 1/2002 |
| JP | 2003-125503 | 4/2003 |
| JP | 2009-225551 | 10/2009 |
| JP | 2010-103200 | 5/2010 |
| JP | 2010-226946 | 10/2010 |

(Continued)

OTHER PUBLICATIONS

Japanese Office Action, dated Aug. 19, 2014, issued in corresponding Japanese Patent Application No. 2011-073949. English Translation. Total 6 pages.

(Continued)

*Primary Examiner* — Rexford Barnie
*Assistant Examiner* — Thai Tran
(74) *Attorney, Agent, or Firm* — Ostrolenk Faber LLP

(57) ABSTRACT

The parking facility to store a vehicle (M) in a storage space (S) in a state where the vehicle (M) is mounted on a pallet (2) includes: the pallet (2) in which a portion thereof corresponding to a power-receiving coil (m1) of the vehicle (M) has magnetic field transmissibility; a power-transmitting coil (3) disposed so as to face the portion having the magnetic field transmissibility; and a facility control drive device (4, 5, 6) to supply electric power to the power-transmitting coil (3).

8 Claims, 2 Drawing Sheets

(56) References Cited

FOREIGN PATENT DOCUMENTS

| JP | 2010242297 A | * 10/2010 |
|----|--------------|-----------|
| JP | 2010-281103  | 12/2010   |
| JP | 2011-052470  | 3/2011    |
| JP | 2011-097814  | 5/2011    |

OTHER PUBLICATIONS

European Search Report, dated Sep. 4, 2014, issued in corresponding European Patent Application No. 12764902.8. Total 6 pages.
International Search Report mailed May 22, 2012 in corresponding PCT International Application No. PCT/JP2012/056774.
Chinese Office Action, dated Jan. 7, 2015, issued in corresponding Chinese Patent Application No. 201280014863.3. English translation included. Total 8 pages.

* cited by examiner

PARKING FACILITY

CROSS-REFERENCE TO RELATED APPLICATIONS

The present application is a 35 U.S.C. §§371 national phase conversion of PCT/JP2012/056774, filed Mar. 15, 2012, which claims priority to Japanese Patent Application No. 2011-073949, filed Mar. 30, 2011, the contents of which are incorporated herein by reference. The PCT International Application was published in the Japanese language.

TECHNICAL FIELD

The present invention relates to a parking facility.

BACKGROUND ART

Patent Documents 1 and 2 shown below disclose technologies to charge a battery of a vehicle during parking time thereof, in a mechanical-parking facility to store the vehicle in a state where the vehicle is mounted on a movable pallet. Patent Document 3 shown below discloses a technology to transmit electric power wirelessly by using the electromagnetic induction between coils.

DOCUMENT OF RELATED ART

Patent Document

[Patent Document 1] Japanese Unexamined Patent Application, First Publication No. H5-256038
[Patent Document 2] Japanese Unexamined Patent Application, First Publication No. 2003-125503
[Patent Document 3] Japanese Unexamined Patent Application, First Publication No. 2009-225551

SUMMARY OF INVENTION

Technical Problem

In the technology disclosed in Patent Document 1, since power cables have to be attached and removed to supply electric power to the vehicle, operations using a complex automatic apparatus or human-intervention are necessary. In the technology disclosed in Patent Document 2, electric power is supplied to the pallet wirelessly. However, since power cables have to be attached and removed in supplying electric power from the pallet to the vehicle, operations using a complex automatic apparatus or human-intervention are necessary similarly to Patent Document 1.

The present invention has been made in view of the above circumstances, and aims to provide a parking facility in which the attachment and removal of power-supplying cables are unnecessary when supplying electric power to a vehicle.

Solution to Problem

According to a first aspect of the present invention, a parking facility to store a vehicle in a storage space in a state where the vehicle is mounted on a pallet includes: the pallet in which a portion thereof corresponding to a power-receiving coil of the vehicle has magnetic field transmissibility; a power-transmitting coil disposed so as to face the portion having the magnetic field transmissibility; and a facility control drive device to supply electric power to the power-transmitting coil.

According to a second aspect of the present invention, in the first aspect, the power-transmitting coil is provided in the storage space, and the facility control drive device starts to supply electric power to the power-transmitting coil when detecting that the vehicle together with the pallet is stored in the storage space.

According to a third aspect of the present invention, in the first or second aspect, the power-transmitting coil is provided in part of a plurality of storage spaces. In addition, the facility control drive device makes the vehicle be stored in the storage space provided with the power-transmitting coil, the vehicle which has been judged capable of receiving electric power, and the facility control drive device supplies electric power to the power-transmitting coil.

According to a fourth aspect of the present invention, in any one of the first to third aspects, the facility control drive device judges whether the vehicle is capable of receiving electric power, by communication with the vehicle through the power-transmitting coil.

According to a fifth aspect of the present invention, in any one of the first to fourth aspects, the portion having the magnetic field transmissibility is an opening.

Effects of Invention

According to the present invention, since electric power is supplied to the vehicle by the wireless transmission between the power-transmitting coil and the power-receiving coil through the pallet, the attachment and removal of power-supplying cables are unnecessary when supplying electric power to the vehicle. It is possible to save manpower because human-intervention for attaching and removing power cables becomes unnecessary, or it is possible to simplify the maintenance of apparatus because the mechanism to automatically attach and remove power cables becomes unnecessary. In addition, the electrical contact failure caused due to imperfect attachment and removal is prevented.

DESCRIPTION OF EMBODIMENTS

An embodiment of the present invention is described below with reference to the drawings.

Figure 1A:
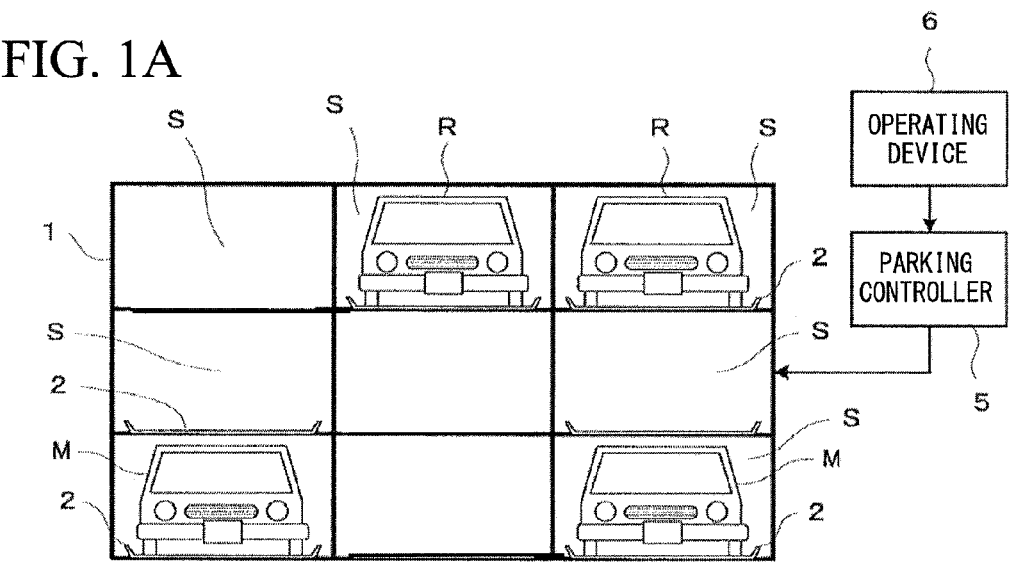
FIG. 1A is a schematic front view showing the entire configuration of a mechanical-parking place (parking facility) in an embodiment of the present invention.
Figure 1B:
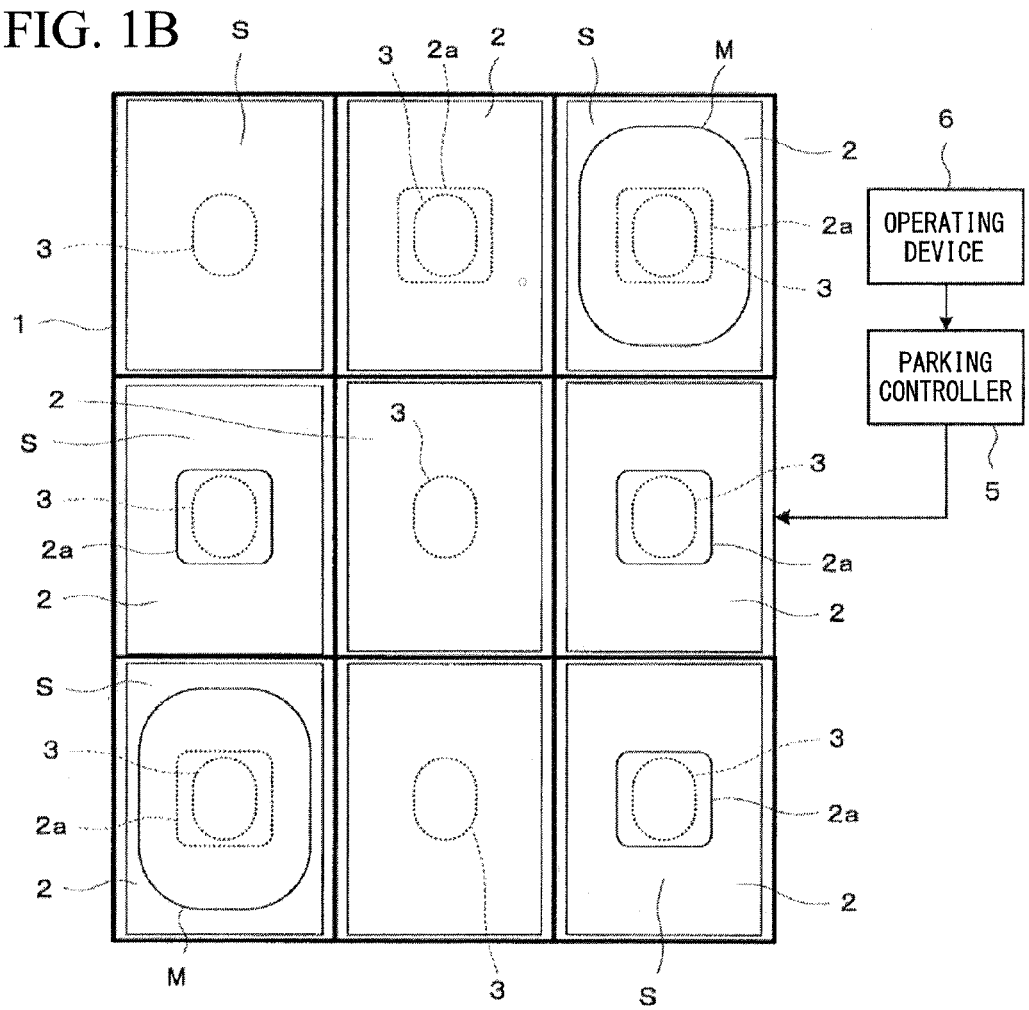
FIG. 1B is a schematic top view showing the entire configuration of the mechanical-parking place.
Figure 2:
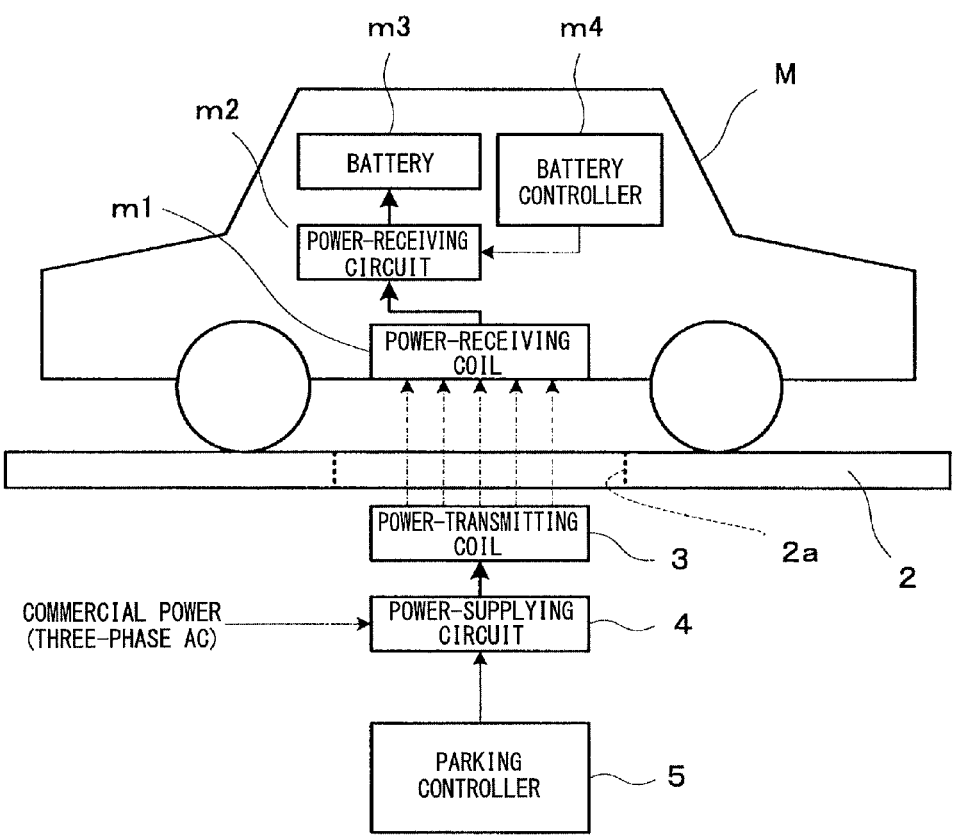
FIG. 2 is a diagram showing the main configuration of the mechanical-parking place.

As shown in FIGS. 1A, 1B and 2, a mechanical-parking place (parking facility) in this embodiment is configured to include a vehicle storage rack 1, a pallet 2, a power-transmitting coil 3, a power-supplying circuit 4, a parking controller 5 and an operating device 6. Among these components, the power-supplying circuit 4, the parking controller 5 and the operating device 6 comprise a facility control drive device. FIG. 1A shows the vehicle storage rack 1 viewed from the front thereof, and FIG. 1B shows the vehicle storage rack 1 viewed from top.

As shown in FIGS. 1A and 1B, the vehicle storage rack 1 contains a plurality of storage spaces S (a total of 27 spaces) arranged in three rows in the front-and-back direction, in three columns in the left-and-right direction and in three levels in the up-and-down direction. In the vehicle storage rack 1 in this embodiment, the number of the storage spaces S is reduced for the convenience of description, but an actual vehicle storage rack contains more storage spaces S. As shown in FIGS. 1A and 1B, storage spaces S are arranged in three rows in the front-and-back direction, in three columns in the left-and-right direction and in three levels in the up-and-down direction, and each of the storage spaces S has a rectangular area. Pallets 2 are stored in part of the plurality of storage spaces S.

The pallet 2 is a rectangular plate-shaped member formed of metal (for example, steel) in order to mount a vehicle thereon, and is formed so as to be slightly smaller than the size of the storage space S. The pallet 2 moves in the front-and-back horizontal direction, the left-and-right horizontal direction and the vertical direction, by drive power of a drive mechanism (not shown) controlled by the parking controller 5. An opening 2a is formed in the central or nearly central portion of the pallet 2. As shown in FIG. 2, the opening 2a is provided at the position corresponding to the power-transmitting coil 3, and is formed so as to be slightly greater than the size of the power-transmitting coil 3.

The opening 2a is provided in the pallet 2 for the main purpose of not interrupting the magnetic field emitted from the power-transmitting coil 3. That is, in the pallet 2, a portion thereof corresponding to the power-transmitting coil 3 has magnetic field transmissibility. In this pallet 2, for example, in order to improve the mechanical strength of the pallet 2, the opening 2a may be filled with a magnetic field transmissible material such as a resin which does not interrupt the above magnetic field.

The power-transmitting coil 3 is an induction coil provided in each of the storage spaces S so as to face the opening 2a of the pallet 2. The power-transmitting coil 3 generates an induction magnetic field by being energized from the power-supplying circuit 4. The power-transmitting coil 3 is configured by winding conductive wires around a vertical axis. Therefore, the direction of the magnetic field generated by the energization from the power-supplying circuit 4 is in the vertical direction, as shown by arrow-dotted lines in FIG. 2.

As shown in the drawings, the vehicle is mounted on the pallet 2. As the vehicle stored in this mechanical-parking place, a hybrid vehicle driven by an engine (such as internal-combustion engine) and a motor, an electric vehicle driven by a motor or the like is presented in addition to a normal vehicle driven by an engine. That is, these various vehicles can be mounted on the pallet 2. However, the target vehicle charged by the mechanical-parking place is a vehicle M including at least a power-receiving coil m1, a power-receiving circuit m2, a battery m3 and the like as shown in FIG. 2, and a vehicle R which does not include the power-receiving coil m1, the power-receiving circuit m2, the battery m3 and a battery controller m4 is excluded from the target vehicle.

The power-receiving coil m1 is an induction coil to face the power-transmitting coil 3 when the vehicle M is mounted on a predetermined position of the pallet 2. The power-receiving coil m1 receives electric power from the power-transmitting coil 3 wirelessly, by the electromagnetic induction caused by the magnetic field generated by the power-transmitting coil 3. Thereafter, the power-receiving coil m1 outputs electric power to the power-receiving circuit m2.

The power-receiving coil m1 is configured by winding conductive wires around a vertical axis, similarly to the power-transmitting coil 3. Thus, the magnetic coupling coefficient of the power-receiving coil m1 to the power-transmitting coil 3 is high. That is, the power-receiving coil m1 has a configuration capable of easily generating the electromagnetic induction by the magnetic field generated from the power-transmitting coil 3.

The power-receiving circuit m2 includes a converter to convert electric power (AC power) input from the power-receiving coil m1, into DC power, and a charging circuit to supply the DC power to the battery m3. In addition, the operation of the power-receiving circuit m2 is controlled by the battery controller m4. The battery m3 is a secondary battery such as a lithium-ion battery and a lead battery. The battery m3 stores the DC power supplied from the power-receiving circuit m2, and the battery m3 discharges and supplies electric power to various destinations depending on the demand from the vehicle M. The battery controller m4 controls the charging to the battery m3 by controlling the operation of the power-receiving circuit m2.

The power-supplying circuit 4 is an electric power converter to convert three-phase AC from commercial power supply, into AC power having a desired frequency, and the electric power converter to supply AC power to the power-transmitting coil 3. The power-supplying operations of the power-supplying circuit 4 to the power-transmitting coil 3 are controlled by the parking controller 5.

The parking controller 5 is a controller to control the entire mechanical-parking place. The parking controller 5 is electrically connected to various controlled objects including the power-supplying circuit 4, and is also electrically connected to the operating device 6. The parking controller 5 controls the various controlled objects based on, for example, control programs stored in internal non-volatile storages and on the information of operating instructions input from the operating device 6.

The parking controller 5 also has the function of sending power-supplying control signals to the power-transmitting coil 3 through the power-supplying circuit 4. The power-supplying control signals are signals to send and receive the control information about the power-supplying, to and from the battery controller m4. The parking controller 5 judges, for example, whether the vehicle mounted on the pallet 2 is the vehicle M including the power-receiving coil m1, or whether the vehicle M requires the charge to the battery m3, by sending and receiving the power-supplying control signals to and from the battery controller m4. The parking controller 5 controls the power-supplying from the power-supplying circuit 4 to the power-transmitting coil 3 based on the above-described judgments. Since the power-transmitting coil 3 and the power-receiving coil m1 are magnetically coupled together, it is possible to send AC signals between them.

The operating device 6 is a device for a manager who manages and operates the mechanical-parking place to manually input operating instructions. The operating device 6 includes, for example, an operating panel having hardware keys, or a touch panel. The operating instructions manually input into the operating device 6 by the operation of the manager are sent from the operating device 6 to the parking controller 5, as the information of operating instructions. For example, a manual operation button (storage instruction button) is provided in the operating device 6 in order to instruct the mechanical-parking place to store the vehicle placed at a storage entrance. When the manual operation button is pressed, the parking controller 5 makes the vehicle placed at the storage entrance be stored in the vacant storage space S, together with the pallet 2.

Next, the operation of this mechanical-parking place having the above-described configuration is described below in detail.

In a case in which a vehicle will be parked in the mechanical-parking place, the vehicle is mounted on the pallet 2 in the storage space S (for example, the storage space S positioned at lower left in FIG. 1B) which is pre-determined as the storage entrance beforehand, for example, by being driven by the driver thereof.

The manager of the mechanical-parking place presses the storage instruction button of the operating device 6, thereby inputting storage instructions into the parking controller 5. When storing the vehicle, in a case in which the manager receives the charging request for the battery m3 from the driver, the manager presses a charging instruction button in addition to the storage instruction button, thereby inputting charging instructions into the parking controller 5.

When the storage instructions and the charging instructions are input into the parking controller 5 from the operating device 6, the parking controller 5 confirms whether the vehicle placed at the storage entrance is the vehicle M, by sending the power-supplying control signals to the power-transmitting coil 3 through the power-supplying circuit 4. When the power-supplying control signals are input into the power-transmitting coil 3, the power-transmitting coil 3 emits the magnetic field based on the power-supplying control signals, into the surrounding spaces thereof. At this time, if the vehicle M including the power-receiving coil m1 and the like is mounted on the pallet 2, the battery controller m4 of the vehicle M receives the power-supplying control signals by the electromagnetic induction through the power-receiving coil m1, the power-receiving circuit m2 and the like. Thereafter, the battery controller m4 of the vehicle M sends response signals against the power-supplying control signals, to the power-receiving coil m1 through the power-receiving circuit m2. The response signals are input into the parking controller 5 through the power-transmitting coil 3 and the power-supplying circuit 4.

In contrast, if the vehicle R is mounted on the pallet 2, since the vehicle R does not include the power-receiving coil m1 and the like, the vehicle R cannot send the response signals. Therefore, the parking controller 5 sends the power-supplying control signals to the power-transmitting coil 3 through the power-supplying circuit 4 in order to confirm whether the vehicle placed at the storage entrance is the vehicle M, and thereafter, if the parking controller 5 receives the response signals within a predetermined threshold time, the parking controller 5 identifies the vehicle placed at the storage entrance as the vehicle M. On the other hand, if the response signals are not received within the predetermined threshold time, the parking controller 5 identifies the vehicle placed at the storage entrance as the vehicle R.

After the above-described vehicle identification process is finished, the parking controller 5 makes the vehicle placed at the storage entrance be stored in the vacant storage space S, together with the pallet 2. If the parking controller 5 identifies the vehicle placed at the storage entrance as the vehicle M in the vehicle identification process, after the movement of the vehicle M to the vacant storage space is finished, the parking controller 5 sends the power-supplying control signals to the power-transmitting coil 3 through the power-supplying circuit 4 in order to confirm the charging state of the battery m3. The parking controller 5 judges the charging state of the battery m3, by receiving the response signals against the power-supplying control signals from the battery controller m4 through the power-transmitting coil 3 and the power-supplying circuit 4. If the parking controller 5 determines that the battery m3 is not in the fully-charged state, the parking controller 5 makes the power-supplying circuit 4 start supplying AC power to the power-transmitting coil 3. In addition, the mechanical-parking place may be provided with a detecting device (not shown) to detect that the vehicle M together with the pallet 2 has been stored in the vacant storage space. After detecting the storage of the vehicle M based on output signals or the like from the detecting device, the parking controller 5 may make the power-supplying circuit 4 begin to supply AC power to the power-transmitting coil 3.

AC power is supplied to the power-transmitting coil 3 from the power-supplying circuit 4, and the magnetic field caused by this AC power is generated in the spaces around the power-transmitting coil 3. Electromotive force is generated in the power-receiving coil m1 by the electromagnetic induction caused by this magnetic field, whereby the AC power is transmitted to the power-receiving coil m1 wirelessly. AC power generated in the power-receiving coil m1 based on the generation of the electromotive force is stored in the battery m3 as DC power via the power-receiving circuit m2 from the power-receiving coil m1. As a result of this charge, when the battery m3 becomes the fully-charged state, the battery controller m4 outputs the response signals indicating this state to the power-receiving coil m1 through the power-receiving circuit m2. When the parking controller 5 receives the response signals through the power-transmitting coil 3 and the power-supplying circuit 4, the parking controller 5 makes the power-supplying circuit 4 cease supplying electric power to the power-transmitting coil 3.

According to the mechanical-parking place, the charge processing to the battery m3 of the vehicle M is performed by the above-described steps, but this charge processing requires no attachment and removal of power-supplying cables using an automatic apparatus or relying on human-intervention. Thus, according to the mechanical-parking place, it is possible to very easily supply electric power to the vehicle M.

According to the mechanical-parking place, since the opening 2a is formed in the pallet 2, it can be prevented that the magnetic coupling coefficient between the power-transmitting coil 3 and the power-receiving coil m1 deteriorates due to the pallet 2. Therefore, it is possible to highly efficiently supply electric power to the vehicle M. If the opening 2a is not formed, since the pallet 2 is composed of steel having high magnetic permeability, most of the magnetic field generated from the power-transmitting coil 3 is absorbed into the pallet 2. As a result, since the magnetic field acting on the power-receiving coil m1 weakens, the power-supplying efficiency deteriorates significantly.

Even when the charging instructions are input into the parking controller 5 from the operating device 6, in a case in which the parking controller 5 receives the response signals indicating that the battery m3 is in the fully-charged state, after referring to the battery controller m4 for the charging state of the battery m3, the parking controller 5 does not start charging the vehicle M. Therefore, according to the mechanical-parking place, it is possible to more reliably avoid the risk of overcharging to the battery m3. Furthermore, it is possible to reduce energy loss (generation of heat in a power-supplying circuit) due to unnecessary operation of the power-supplying circuit.

In addition, the present invention is not limited to the above-described embodiment, and for example, various modifications such as the following can be adopted.

(1) In the above-described embodiment, the power-transmitting coil 3 is provided in each of the storage spaces S comprising the vehicle storage rack 1, so that the power supply can be performed in all the storage spaces 5, but the present invention is not limited to this configuration. For example, the power-transmitting coil 3 may be provided in only part of the storage spaces S. The vehicle M for which the driver requests the battery charge may be selectively moved from the storage entrance to the vacant storage space having the power-transmitting coil 3, so as to be charged. In this case, the judgment as to whether the vehicle requested to be charged is the vehicle M, and the judgment on the charging state of the battery m3 in the vehicle M may be performed by processes similar to that in the above-described embodiment.

(2) In the above-described embodiment, the opening 2a is provided in the steel pallet 2 in order to improve the power-supplying efficiency, but the present invention is not limited to this configuration. For example, if the pallet is formed of a resin material having high rigidity, that is, a material having high rigidity and low magnetic permeability, it is possible to improve the power-supplying efficiency without forming an opening.

(3) In the above-described embodiment, the communication between the parking controller 5 and the battery controller m4 is performed by using the power-transmitting coil 3 and the power-receiving coil m1, but the present invention is not limited to this configuration. For example, a wireless communication device which communicates with the vehicle M may be provided in the parking controller 5, another wireless communication device to communicate with the parking controller 5 may be provided in the vehicle M, and the communication may be performed between the wireless communication devices.

(4) In the above-described embodiment, three-phase AC is supplied to the power-supplying circuit 4, but if capable of supplying required electric power thereto, single-phase AC or DC power may be used.

(5) For the wireless power transmission using the power-transmitting coil 3 and the power-receiving coil m1, for example, there is a system in which a resonance circuit is configured by connecting a capacitor to the power-transmitting coil 3 in parallel, another resonance circuit is configured by connecting a capacitor to the power-receiving coil m1 in parallel, and the resonance frequencies of the resonance circuits are matched with each other, in addition to the system of using the electromagnetic induction as in the above-described embodiment. The present invention may adopt the above-described wireless power transmission system.

(6) The structure of the winding in conductive wires of the power-transmitting coil 3 is not limited to around a vertical axis, and the direction of the magnetic field generated by the energization from the power-supplying circuit 4 is not limited to the vertical direction. That is, the structure of the winding and the direction of the magnetic field may be configured so that the wireless power transmission can be performed with high efficiency when the power-transmitting coil 3 and the power-receiving coil m1 face each other in the up-and-down direction, and so that the magnetic field is concentrated into the opening 2a of the pallet 2.

INDUSTRIAL APPLICABILITY

The present invention can be applied to a parking facility to store a vehicle in a storage space in a state where the vehicle is mounted on a pallet.

DESCRIPTION OF REFERENCE SIGNS

1 Vehicle storage rack
2 Pallet
2a Opening
3 Power-transmitting coil
4 Power-supplying circuit
5 Parking controller
6 Operating device
M Vehicle
m1 Power-receiving coil
m2 Power-receiving circuit
m3 Battery
m4 Battery controller

The invention claimed is:

1. A parking facility to store in a storage space, a vehicle including a power-receiving coil the parking facility comprising:
   a pallet on which the vehicle is mounted;
   a power-transmitting coil wirelessly transmitting electric power to the power-receiving coil; and
   a facility control drive device to supply electric power to the power-transmitting coil,
   wherein a portion of the pallet corresponding to the power-receiving coil has magnetic field transmissibility, and
   the power-transmitting coil is disposed under the pallet so as to face the portion having magnetic field transmissibility.

2. The parking facility according to claim 1,
   wherein the power-transmitting coil is provided in the storage space, and
   the facility control drive device starts to supply electric power to the power-transmitting coil when detecting that the vehicle together with the pallet is stored in the storage space.

3. The parking facility according to claim 1,
   wherein the power-transmitting coil is provided in part of a plurality of storage spaces, and
   the facility control drive device makes the vehicle be stored in the storage space provided with the power-transmitting coil, the vehicle which has been judged capable of receiving electric power, and supplies electric power to the power-transmitting coil.

4. The parking facility according to claim 1,
   wherein the facility control drive device judges whether the vehicle is capable of receiving electric power, by communication with the vehicle through the power-transmitting coil.

5. The parking facility according to claim 1,
   wherein the portion having the magnetic field transmissibility is an opening.

6. The parking facility according to claim 1,
   wherein the pallet is configured to move to the storage space in a state where the vehicle is mounted on the pallet, and
   the power-transmitting coil is provided in the storage space.

7. The parking facility according to claim 5,
   wherein the opening is filled with a magnetic field transmissible material.

8. A parking facility to store in a storage space, a vehicle including a power-receiving coil, the parking facility comprising:
   a pallet on which the vehicle is mounted; and
   a power-transmitting coil wirelessly transmitting electric power to the power-receiving coil, wherein a portion of the pallet corresponding to the power-receiving coil has magnetic field transmissibility, and the power-transmitting coil is disposed under the pallet so as to face the portion having magnetic field transmissibility.

* * * * *